US008853906B2

(12) United States Patent
Harrell et al.

(10) Patent No.: US 8,853,906 B2
(45) Date of Patent: Oct. 7, 2014

(54) OPTICAL ELEMENT SWITCHING SYSTEM USING A HALBACH ARRAY

(75) Inventors: John P. Harrell, Mission Viejo, CA (US); Geoffrey A. Long, Torrance, CA (US); Michael L. Menendez, Corona, CA (US)

(73) Assignee: Raytheon Company, Waltham, MA (US)

( * ) Notice: Subject to any disclaimer, the term of this patent is extended or adjusted under 35 U.S.C. 154(b) by 811 days.

(21) Appl. No.: 12/945,701

(22) Filed: Nov. 12, 2010

(65) Prior Publication Data

US 2012/0120516 A1 May 17, 2012

(51) Int. Cl.
| H02K 21/14 | (2006.01) |
| G02B 7/00 | (2006.01) |
| G02B 26/00 | (2006.01) |
| F16C 39/06 | (2006.01) |
| H02K 21/02 | (2006.01) |
| H02K 1/27 | (2006.01) |

(52) U.S. Cl.
CPC ............... *G02B 7/005* (2013.01); *G02B 26/00* (2013.01); *F16C 39/063* (2013.01); *G02B 26/008* (2013.01); *H02K 21/029* (2013.01); *H02K 1/278* (2013.01); *G02B 7/006* (2013.01); *H02K 21/14* (2013.01)
USPC ............................ 310/103; 310/114; 310/109

(58) Field of Classification Search
CPC .................................. H02K 21/14; G02B 7/00
USPC ............... 310/103, 51, 68 B; 359/896, 224.1, 359/224.2, 225.1, 226.1, 226.2, 226.3; 335/229, 179, 233
See application file for complete search history.

(56) References Cited

U.S. PATENT DOCUMENTS

| 5,277,076 A | 1/1994 | Ostaszewski |
| 7,265,470 B1 * | 9/2007 | Paden et al. ............... 310/156.43 |
| 7,561,346 B1 | 7/2009 | Ruda et al. |
| 7,872,381 B2 * | 1/2011 | Watanabe et al. ............... 310/58 |
| 8,193,883 B2 * | 6/2012 | Long et al. ..................... 335/179 |
| 2003/0179982 A1 | 9/2003 | Osterberg |
| 2007/0265606 A1 * | 11/2007 | DeBenedictis et al. ......... 606/15 |
| 2009/0108684 A1 * | 4/2009 | Long et al. ....................... 310/36 |
| 2009/0294472 A1 * | 12/2009 | Buckley et al. ................. 222/59 |

FOREIGN PATENT DOCUMENTS

| DE | 1033689 | * 3/2005 |
| DE | 102009011681 | 8/2010 |

OTHER PUBLICATIONS

PCT Application EP 11 18 4354; International Search Report Issued Feb. 10, 2012.

* cited by examiner

*Primary Examiner* — Terrance Kenerly
(74) *Attorney, Agent, or Firm* — Thorpe North & Western LLP

(57) ABSTRACT

Various embodiments provide a system for moving optical elements. The system includes a first rotor and a second rotor configured to rotate in opposite directions. The system further includes a first plurality of paddles coupled to the first rotor, each of the plurality of paddles having an aperture configured to receive a first optical element, and a second plurality of paddles coupled to the second rotor, each of the plurality of paddles having an aperture configured to receive a second optical element. The first rotor and the second rotor are configured to move the first optical element between a retracted position and a desired position and to move the second optical element between the desired position and a retracted position substantially simultaneously such that a reaction torque of the first rotor cancels a reaction torque of the second rotor.

20 Claims, 11 Drawing Sheets

OPTICAL ELEMENT SWITCHING SYSTEM USING A HALBACH ARRAY

STATEMENT AS TO RIGHTS TO INVENTIONS MADE UNDER FEDERALLY SPONSORED RESEARCH AND DEVELOPMENT

This invention was made with government support. The government has certain rights in the invention.

BACKGROUND

This disclosure pertains to mechanisms and systems for moving optical elements in general and in particular to a system using a Halbach array for moving an optical element.

Systems and mechanisms for moving optical elements in and out of locations such as switching between optical filters or optical elements (e.g., lenses, mirrors, prisms, etc.) in and out of an optical path are in increasing demand for various applications including optical imaging, optical surveillance, etc. The simplest moving or switching systems or mechanisms utilized for moving optical elements or for switching between optical elements do not contain any provision for reducing the reaction forces and moments. For systems that are not sensitive to vibrations or systems that do not require the switch to occur in a very short period of time, this simple approach may be adequate. However, as systems increase in performance they can become more susceptible to vibration and may require a more sophisticated approach.

In some conventional systems, a reaction mass is added to the switching mechanism. Instead of applying a torque between the moving element and the base, a torque is applied between the moving element and the reaction mass. The reaction mass moves in an opposite direction from the moving element and, theoretically, no torque is applied to the base. This approach has various disadvantages, the most severe of which is that the mass is usually approximately equal in size and weight to the primary moving element. The added size, weight and complexity of the reaction mass make packaging difficult and add significant weight to the system. The power consumption of this type of mechanism can also be higher than an equivalent mechanism without a reaction mass. This approach has been used extensively on gimbals and beam steering mirrors.

In systems where there are at least two elements and one of them is always deployed and the other elements are retracted, the torque applied to the element that moves from deployed to retracted can be used to cancel torque of the element that moves from retracted to deployed. This approach is essentially the same as the reaction mass approach described above except that another mechanism which is mounted to a common base is used as the reaction mass. Instead of a torque applied directly between the primary moving element and the reaction mass (requiring one actuator), each of the two moving elements applies a torque to a common plate (requiring two actuators). Because the two mechanisms are rotating in opposite directions, it is possible to cancel the reaction torques resulting in a reaction-less system.

In the systems described above, an actuator is usually the sole source of the torque that moves the masses from one position to another. The actuator typically is the dominant source of heat dissipated in the mechanism. In many systems it is highly desirable to minimize the power consumed by the mechanism. In order to reduce the torque supplied by the actuator, and thus the power dissipated by the mechanism, attempts have been made to add passive energy storage elements to the mechanism that will result in a natural tendency to oscillate.

One such mechanism is a non-contacting magnetic latch (NCML). The NCML mechanism primarily makes use of a torsion rod between the moving element and the base to store most of the energy required to perform the switch. The torque profile of the spring is chosen so that the natural oscillation of the spring-mass system naturally carries the moving element between the retracted and deployed states in the desired switch time while requiring minimal actuator torque. In order to hold the mechanism in either the deployed or retracted position, a NCML is used. The latch is designed with coils that provide a means for releasing the rotor by energizing a coil which produces a magnetic field that opposes the magnetic field of the latch's permanent magnet. The latch torque is thus lowered to below the amount required to counteract the spring and the moving element is allowed to swing to the other operating position where it is caught by a similar active latch. The reaction torque of the mechanism is reduced by always operating two mechanisms in opposite directions.

Another such mechanism, referred to as the "Flexure mechanism," suspends the rotor on a cross-blade flexure which also serves as the energy storage element. A passive, non-contacting magnetic latch is provided to cancel the torque of the flexure at the two operating positions in order to create detents at the operating positions. The torque provided by the latch plus the flexure (collectively referred to as the "passive torque") provides a source of stored energy which allows the rotor to switch between the two operating positions with minimal additional torque. The flexure and magnetic latch torque vs. deflection angle profiles are designed to provide a passive torque profile that is optimized to minimize the amount of power required to move the mechanism between its two operating positions. A servo which includes a brushless DC motor and angle sensor is used to control the motion of the rotor. Similar to the NCML mechanism, the reaction torque of this mechanism is also reduced by always operating two mechanisms in opposite directions.

What is needed is an optical switching system for moving optical elements that is configured to, inter alia, cancel reaction torques generated during movement of the optical elements by counter rotating the optical elements.

SUMMARY

One or more embodiments of the present disclosure provide a system for moving optical elements. The system includes a first rotor and a second rotor configured to rotate in opposite directions. The system further includes a first plurality of paddles coupled to the first rotor, each of the plurality of paddles having an aperture configured to receive a first optical element, and a second plurality of paddles coupled to the second rotor, each of the plurality of paddles having an aperture configured to receive a second optical element. The first rotor and the second rotor are configured to move the first optical element between a retracted position and a desired position and to move the second optical element between the desired position and a retracted position substantially simultaneously such that a reaction torque of the first rotor cancels a reaction torque of the second rotor.

Another embodiment of the present disclosure provides a system for moving optical elements including a rotor and a first pulley coupled to the rotor and a second pulley coupled to the first pulley via a transmission belt. The system further includes a first plurality of paddles coupled to the first pulley, each of the plurality of paddles having an aperture configured to receive a first optical element, and a second plurality of paddles coupled to the second pulley, each of the plurality of paddles having an aperture configured to receive a second optical element. The rotor and the transmission belts are configured to move the first optical element between a retracted position and a desired position and to move the second optical element between the desired position and a retracted position substantially simultaneously such that a reaction torque of the first pulley cancels a reaction torque of the second pulley.

These and other features and characteristics of the present disclosure, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. In one embodiment of this disclosure, the structural components illustrated herein are drawn to scale. It is to be expressly understood, however, that the drawings are for the purpose of illustration and description only and are not intended as a definition of the limits of the inventive concept. As used in the specification and in the claims, the singular form of "a", "an", and "the" include plural referents unless the context clearly dictates otherwise.

DETAILED DESCRIPTION

Figure 1:
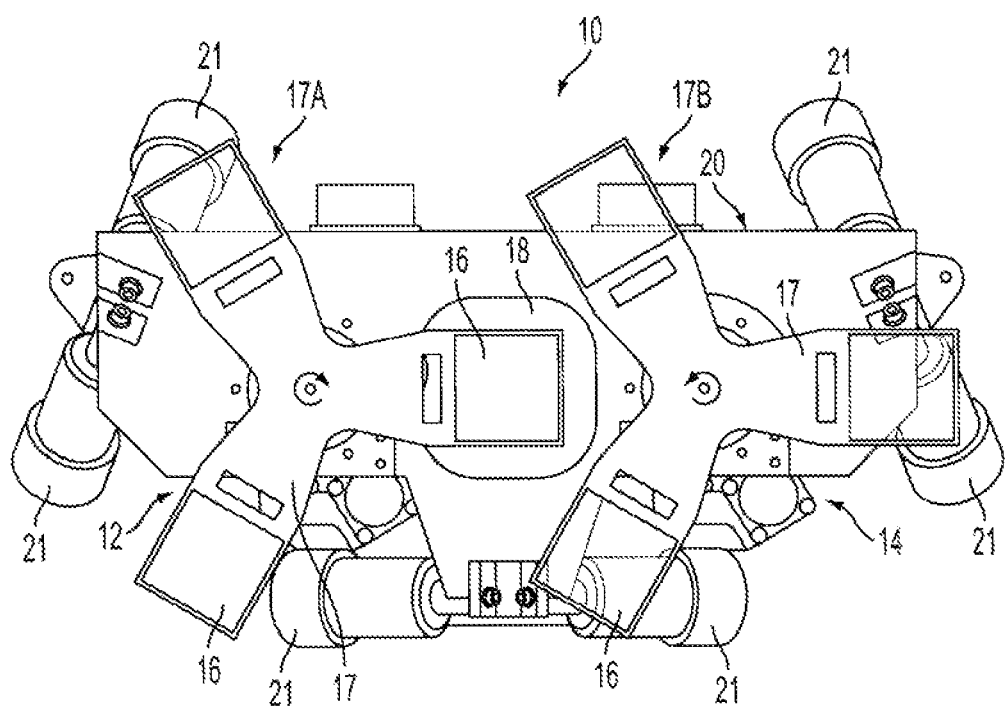
FIG. 1 depicts a system for moving optical elements in and out of a location (e.g., a beam path), according to one embodiment.

FIG. 1 depicts a system for moving optical elements in and out of a location (e.g., a beam path), according to one embodiment. The optical elements include, but are not limited to, optical filters (e.g., polarization filters, spectral filters, uniform temperature black surfaces), lenses, mirrors, gratings, opaque ray-blocking elements, etc. System 10 includes two mechanisms 12 and 14 that are each capable of moving an optical element (e.g., a lens, a polarization filter, a spectral filter, a ray-blocking element, a uniform temperature black surface, a mirror, a grating, a prism, etc.) 16 into multiple deployed positions or refracted positions (referred collectively as "operating positions") in and out of desired location 18. For example, location 18 can be a location along a path of a radiation beam. As shown in FIG. 1, in one embodiment, optical element 16 is mounted on blade or paddle 17 for holding optical element 16. As shown in FIG. 1, each of mechanisms 12 and 14 has a plurality of paddles 17. Mechanism 12 has paddles 17A and mechanism 14 has paddles 17B. Although, three paddles are shown, as it can be appreciated one, two or more paddles 17 can be provided in mechanism 12 or mechanism 14 or both. Similarly, although, one optical element 16 is shown mounted on each paddle 17, two or more optical elements 16 can be arranged (e.g., superposed so as to intersect a beam of radiation) and mounted on one or more of paddles 17 of either mechanism 12, mechanism 14, or both. Furthermore, the optical elements 16 mounted on each of the paddles 17 may be the same or different. For example, in one embodiment, the paddles 17 can be provided with different wavelength bandpass spectral filters. For example, in another embodiment, the paddles 17 can be provided with lenses having different focal distances, etc. In yet another embodiment, one paddle may be provided with a spectral filter while another paddle may be provided with a mirror or a lens, etc. The mechanisms 12 and 14 are mounted onto a mounting structure (e.g., a metal plate) 20. The mounting structure 20 is in turn mounted to a base structure (not shown) via vibration isolating struts 21. Vibration isolating struts 21 isolate the base structure and hence other optical systems from vibrations that may be generated by mechanisms 12 and 14 during operation.

Figure 2:
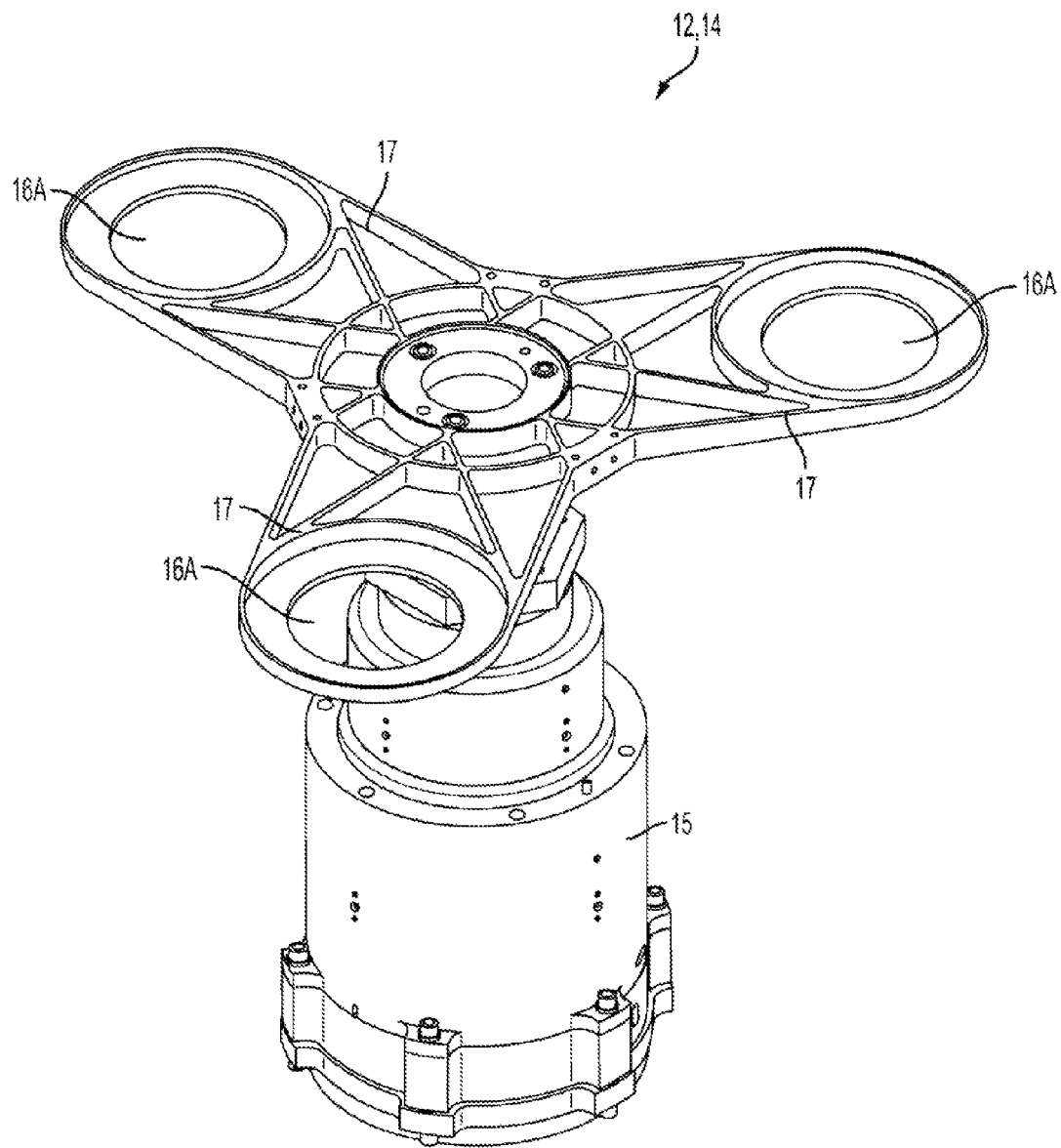
FIG. 2 is a three dimensional perspective view of a rotor for rotating the optical elements, according to one embodiment.

Each of mechanisms 12 and 14 includes a rotor for rotating the paddles 17. FIG. 2 is a three dimensional perspective view of mechanism 12 or 14 with rotor 15, according to one embodiment. Rotors 15 in mechanisms 12 and 14 are configured to rotate corresponding paddles 17A and 17B in opposite direction. For example, while paddles 17A in mechanism 12 are shown in FIG. 1 rotating clockwise, paddles 17B in mechanism 14 are shown rotating counter-clockwise (as illustrated by the semi-circle arrows). FIG. 2 further shows the paddles 17 (in this case 3 paddles) being provided with apertures 16A configured to receive optical elements 16. Although apertures 16A are shown in FIG. 2 having a circular shape, apertures 16A can have any other shape (e.g., square or other polygonal shape, or more complex shape). In operation, for example, mechanism 12 can be arranged in the deployed position while mechanism 14 can be arranged in a retracted position. When optical element 16 held by paddle 17 of mechanism 12 is within desired location 18, other optical elements 16 held by other paddles 17 of mechanism 14 are out of location 18. Similarly, when optical element 16 held by paddle 17 of mechanism 14 is within location 18, other optical elements 16 held by other paddles 17 of mechanism 12 are out of location 18.

System 10 is capable of switching optical element 16 of mechanism 12 deployed into desired location 18 to a retracted position while simultaneously switching one of the adjacent retracted optical elements 16 of the mechanism 14 into deployed desired location 18. A reaction torque of the deploying rotor (e.g., rotor of mechanism 14) cancels a reaction torque of the retracting rotor (e.g., rotor of mechanism 12).

Figure 3:
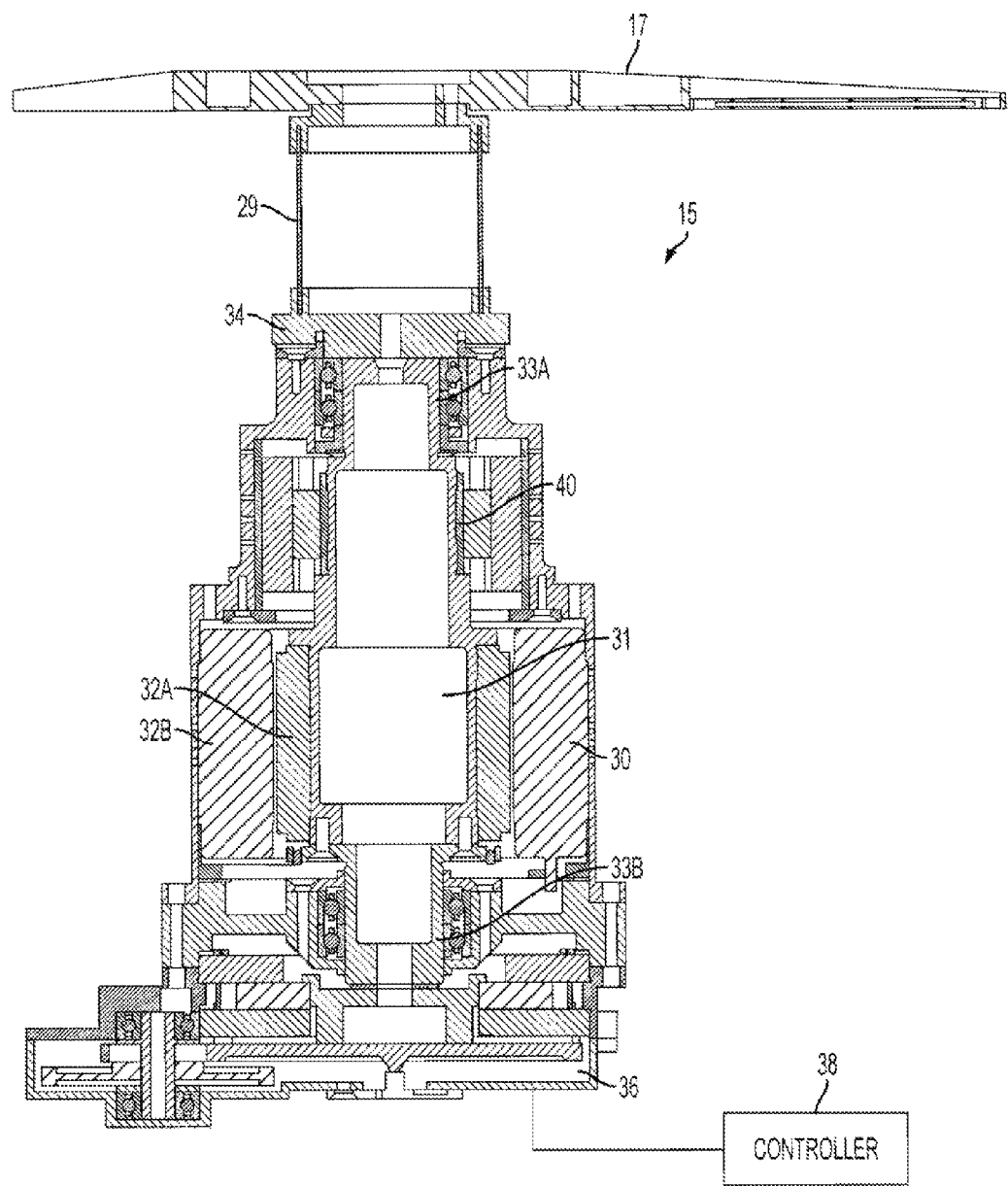
FIG. 3 is a cross-sectional view of the rotor shown in FIG. 2.

FIG. 3 is a cross-sectional view of rotor 15, according to one embodiment. Rotor 15 includes cylinder extension 29. Paddles 17 are secured to cylinder extension 29 with fasteners. Cylinder extension 29 essentially functions as a spacer for positioning paddles 17 of different mechanisms 12 and 14 at different heights. Cylinder extension 29 may also function as a thermal isolator for isolating paddle 17 and thus optical elements 16 from heat that may be generated by rotor 15 during operation. Cylinder extension 29 is optional.

Rotor 15 further includes direct current (DC) motor (e.g., a brushless DC motor) 32. Motor 32 has rotor portion 32A and stator portion 32B. Rotor portion 32A is connected to axle 31. Axle 31 is mounted to bearings 33A and 33B located respectively at an upper portion of rotor 15 and lower portion of rotor 15. Axle 31 is rigidly coupled to support plate 34 on which cylinder extension 29 is mounted. In operation, a rotation of rotor portion 32A is transferred into a rotation of axle 31 which in turn is transferred into a rotation of paddle 17.

Rotor 15 further includes induction angle sensor 36 for detecting an angular position of axle 31 during rotation. Angle sensor 36 is connected to a controller 38 which uses feedforward and angle feedback commands to command rotor 15 to rotate and to command two rotors 15 of mechanisms 12 and 14 to move in opposite directions with substantially the same motion profile, i.e., in synchronism.

Rotor 15 further includes a halbach array 40 mounted at a middle portion of rotor 15. Halbach array 40 is used to reduce an amount of torque and power required to move the optical elements 16 in and out of location 18. The use of Halbach array 40 allows reduction of the torque and power consumption required to switch between optical elements. A detailed description of a Halbach array can be found in U.S. Pat. No. 7,265,470 entitled "Magnetic Spring and Actuators with Multiple Equilibrium Positions," the entire contents of which are incorporated herein by reference.

Figure 4:
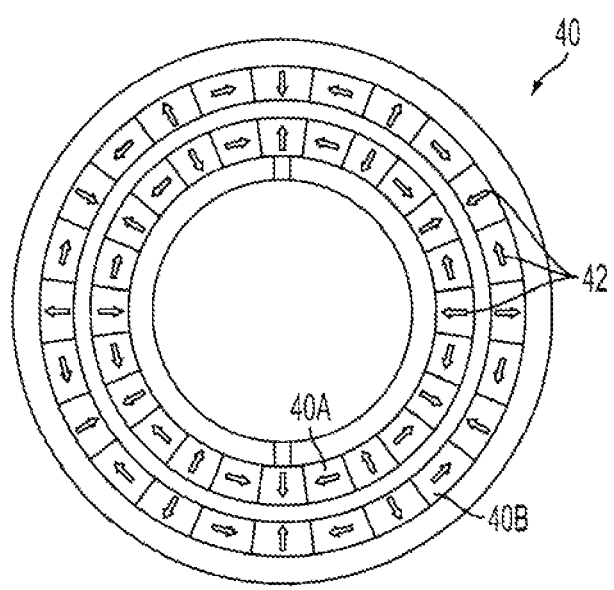
FIG. 4 is a cross-sectional view of a Halbach array, according to one embodiment.

Halbach array 40 includes a plurality of magnets or magnetic dipoles 42. FIG. 4 show a cross-sectional view of Halbach array 40 according to one embodiment. Halbach array 40 includes a movable or rotatable portion 40A and static portion 40B. Rotatable portion 40A and 40B are arranged as concentric cylinders. In Halbach array static portion 40B, the direction of magnetization of each magnet 42 in the array of magnets is rotated clockwise as the array is traversed in a clockwise direction. In Halbach rotatable portion 40A, the direction of magnetization of each magnet 42 in the array of magnets is rotated counter-clockwise as the array is traversed in a clockwise direction.

Array portions 40A and 40B shown in FIG. 4 use 90 degrees of magnetic field rotation from one magnet to the next, or four magnets per wavelength (360 degrees). However, it should be understood that more or less degrees of rotation may be used in order to produce shorter or longer wavelengths. As shown, in FIG. 4, magnetic fields in the array portion 40A and array portion 40B are oriented in such a way that there is a repulsion between the magnetic dipoles or magnets 42. Therefore, the configuration shown in FIG. 4 is an unstable configuration. As a result, a slight excitation or rotation of array portion 40A, for example, will tend to move the magnets in array portion 40A to a position where the magnets in array portion 40A and magnets in array portion 40B attract each other to a stable configuration.

Figure 5A:
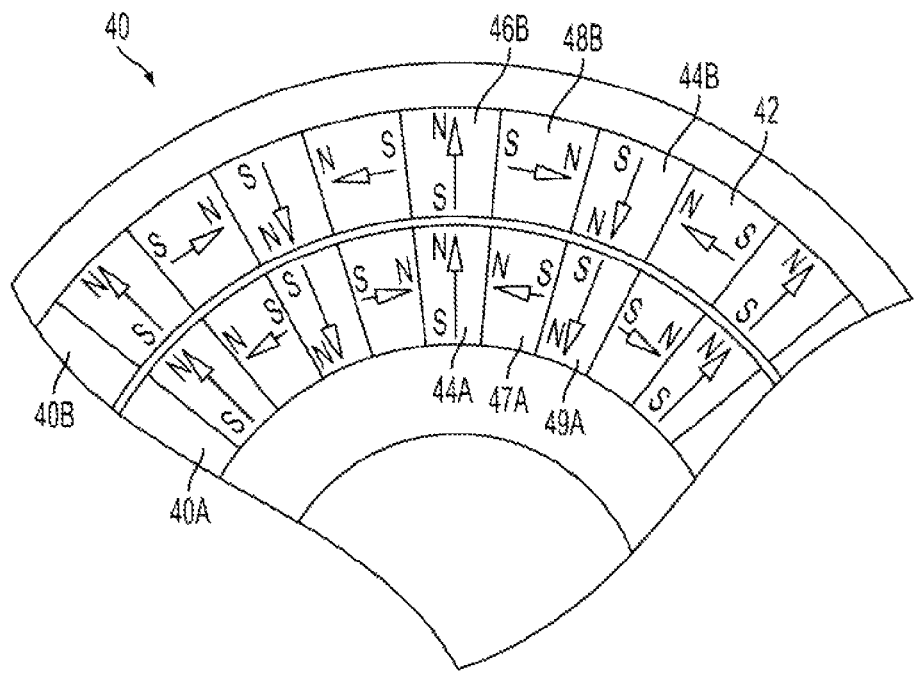
FIG. 5A is a cross-section view of Halbach array in a stable configuration, according to one embodiment.
Figure 5B:
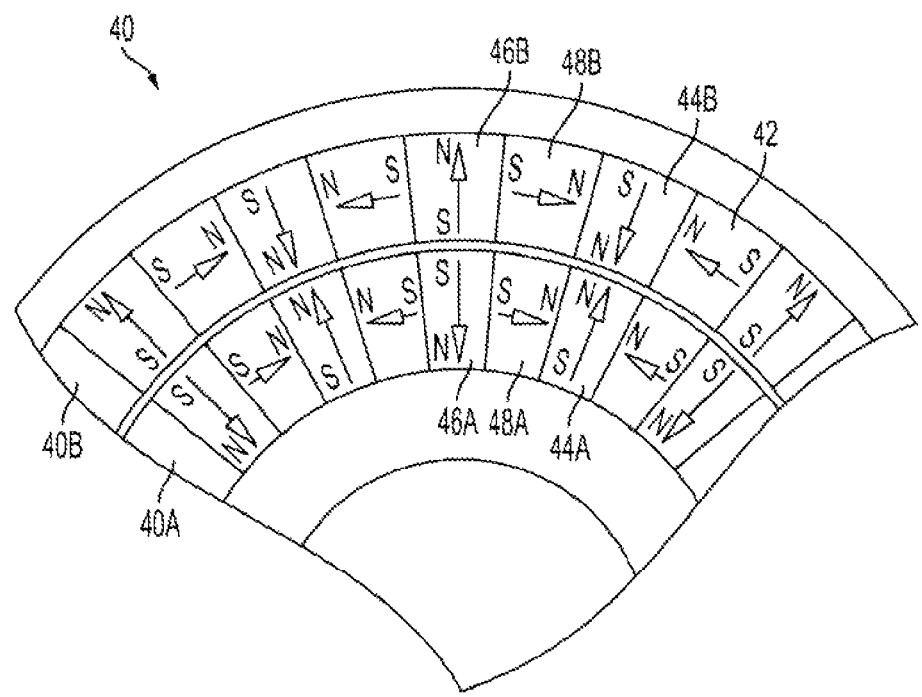
FIG. 5B is a cross-section view of Halbach array in a unstable configuration, according to one embodiment.

FIG. 5A is a cross-sectional view of Halbach array 40 showing array portions 40A and 40B in a stable configuration, according to one embodiment. FIG. 5B is a cross-sectional view of Halbach array 40 depicting array portions 40A and 40B is an unstable configuration, according to one embodiment. In the unstable configuration, as shown in FIG. 5B, a pair of magnets 44A and 44B are oriented opposite to each other such that N pole of magnet 44A faces N pole of the opposite magnet 44B. Similarly, a pair of magnets 46A and 46B are oriented opposite to each other such that S pole of magnet 44A faces S pole of the opposite magnet 44B. In addition, a pair of magnets 48A and 48B are oriented in parallel such that the N pole of magnet 48A faces the N pole of the other magnet 48B and the S pole of the magnet 48A faces the S pole of magnet 48B. Because there is repulsion between like poles of two magnets, this configuration is unstable.

In the stable configuration, as shown in FIG. 5A, a pair of magnets 44A and 46B are oriented in a same direction such that the N pole of magnet 44A faces the S pole of the opposite magnet 46B. Similarly, a pair of magnets 49A and 44B are oriented in the same direction such that the N pole of magnet 44B faces the S pole of the opposite magnet 49A. In addition, a pair of magnets 47A and 48B are oriented in parallel such that the N pole of magnet 48B faces the S pole of the other magnet 47A and the S pole of magnet 48B faces the N pole of magnet 47A. Because there is attraction between opposite poles of two magnets, this configuration is stable.

As illustrated in FIGS. 5A and 5B, while magnets 44B, 46B and 48B have not moved as array portion 40B is static, magnet 44A of array portion 40A has moved from its position where it faces magnet 44B (as shown in FIG. 5B) to a position where it faces magnet 46B (as shown in FIG. 5A). Only a slight excitation is needed in order to move magnet 44A and thus all the array in portion 40A from the configuration shown in FIG. 5B to the configuration shown in FIG. 5A. As a result, this has the effect of focusing the field produced by each array toward the opposing array to produce higher torque per unit of mass of magnet material. Although a repetitive series of 4 magnets are used in each array portion 40A and 40B, as it can be appreciated, more than 4 magnets can be used.

Figure 6:
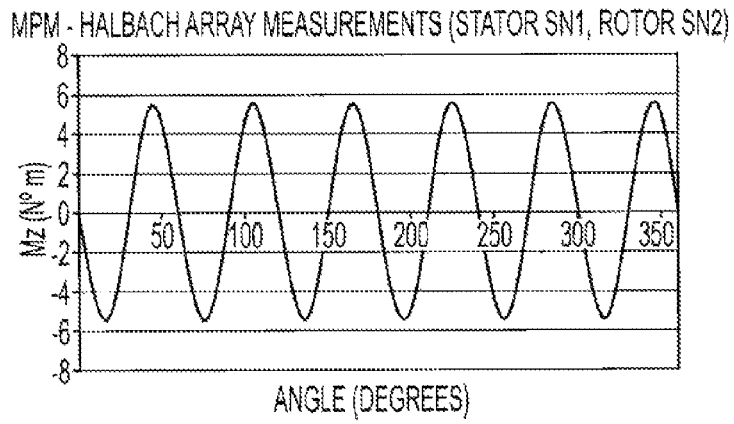
FIG. 6 is plot of a torque moment profile generated by Halbach array shown in FIGS. 4, 5a and 5B as function of angle of rotation, according to one embodiment.

FIG. 6 is plot of a torque moment profile generated by Halbach array 40 as function of the angle of rotation as array portion 40A rotates with respect to static array portion 40B, according to one embodiment. As shown in FIG. 6, the torque moment Mz (in N-m) has an oscillatory behavior as a function of angle of rotation (degrees). The peaks shown in FIG. 6 correspond to the unstable configuration (FIG. 5B), whereas the valleys or troughs correspond to the stable configuration (FIG. 5A). Stable troughs and unstable peaks are approximately 60 degrees apart. Hence, the angle between a stable configuration and an unstable configuration is approximately 30 degrees.

Figure 7:
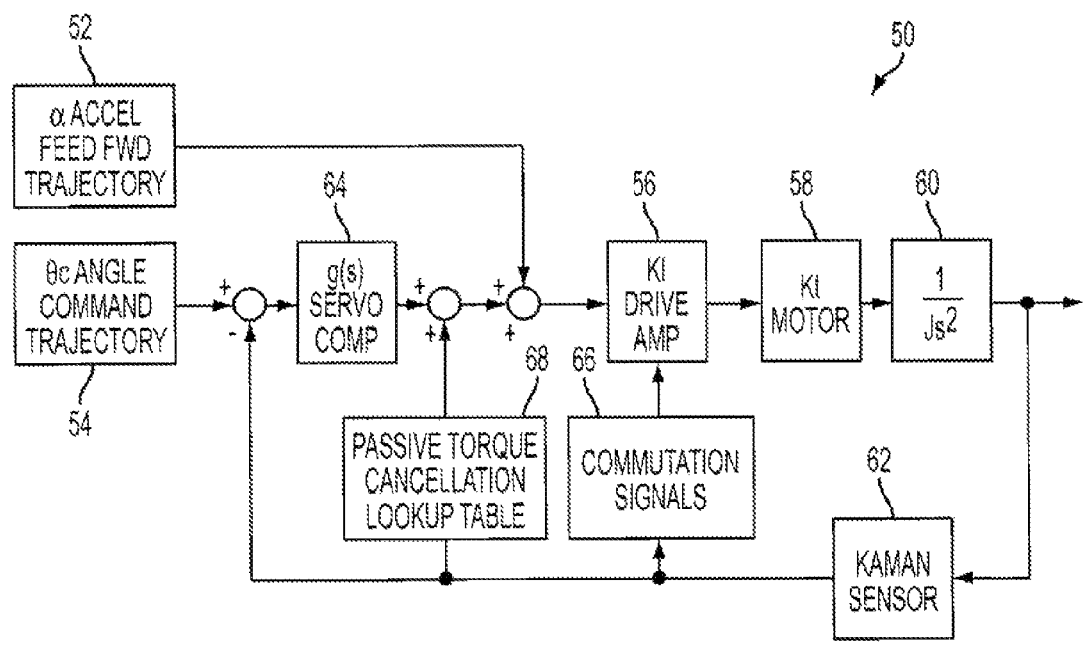
FIG. 7 is a block diagram of a control loop provided within a controller for controlling a system for moving optical elements, according to embodiment.
Figure 8:
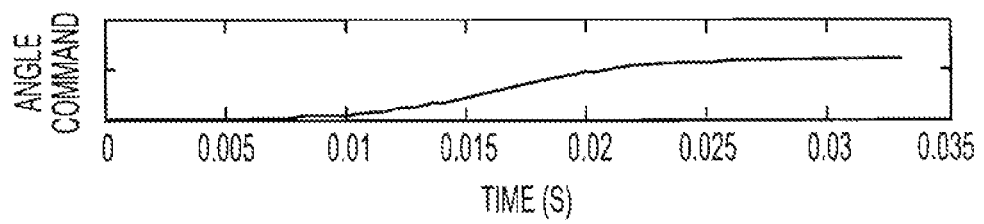
FIG. 8 is a plot of the angle command as a function of time using in control loop shown in FIG. 7, according to one embodiment.
Figure 9:
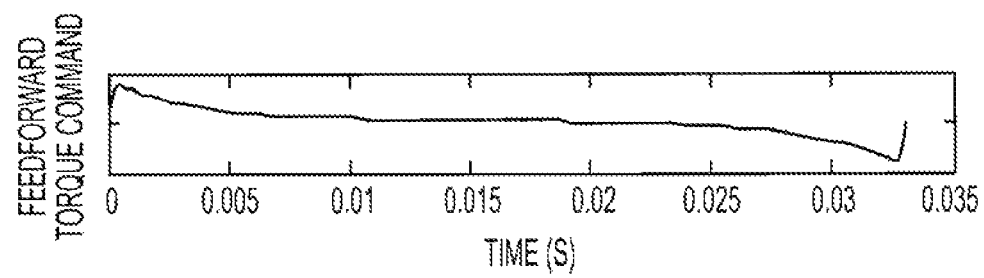
FIG. 9 is a plot of a feed forward torque command as function of time used in control loop shown in FIG. 7, according to one embodiment.

FIG. 7 is a block diagram of the control loop 50 provided within controller 38 (shown in FIG. 3) for control of rotary switching system 10 (i.e., control rotors 15). When a change in angle is desired, inputs are provided to system 10 in an acceleration or torque feed forward trajectory 52 and angle command trajectory 54. An example of angle command trajectory 52 is shown in FIG. 8. FIG. 8 shows a plot of the angle command as a function of time which corresponds to the angle command trajectory. An example of acceleration or torque feed forward trajectory 52 is shown in FIG. 9. FIG. 9 shows a plot of the feed forward torque command as function of time which corresponds to the torque feed forward trajectory. Acceleration or torque feed forward trajectory 54 is an expected signal to be sent to the motor as a function of time. Both acceleration feed forward trajectory 52 and angle command trajectory 54 may be customized in electronics for rotary switching system 10 to take into account differences in individual rotary switching mechanisms 12 and 14.

The acceleration feed forward trajectory 52 is forwarded to drive amplifier 56 with a gain $K_i$. The signal output by drive amplifier 56 is modified by motor gain 58 and inertial term 60, to send an output signal to drive motor 30 (shown in FIG. 3). An angle of paddle 17 (shown in FIGS. 1, 2 and 3) is detected by angle sensor 36 (FIG. 3). The signal from the current sensors 36 is included in the electronics controller system 38 as part of feedback loop 50 as Kaman sensor 62 (made by Kaman Industrial Technologies Corp.). This signal output by Kaman sensor 62 indicates the actual position of the angle and is combined with angle command trajectory 54 and input into servo compensation block (g(s)) 64. The signal input into compensation block 64 is the difference between the expected angle and the actual angle as detected by current sensors 36 through Kaman sensor 62. The information from current sensors 36 is also used as an input for determining commutation signals 66, which are forwarded to drive amplifier 56. The commutation signals are input into drive amplifier 56 to change the amount of current provided to motor 30 to compensate for the relative angle between rotor 32A and stator 32B of motor 30.

The information from current sensor 36 or Kaman sensor 62 is also used as an input to a passive torque cancellation lookup table 68. Passive torque cancellation lookup table 68 provides a desired motor torque versus angle profile for motor 30 (and hence for rotor 15). Passive torque cancellation lookup table 68 is populated based on measured passive torque profile. The table matches all mechanisms (all of the individual rotary switching mechanisms 12, 14) to a common torque profile. By using passive torque cancellation lookup table 68, the torques of each of rotary switching mechanisms 12 and 14 may be equalized, so that an extending torque in one of the mechanisms (e.g., rotor mechanism 12) is substantially equal at all times to a retracting torque in any other of the mechanisms (e.g., rotor mechanism 14).

Control loop 50 within controller 38 may be modified by omitting passive torque cancellation lookup table 68. Such a modified system would rely on acceleration feed forward trajectory 52 and angle command trajectory 54 to perform functions that would be performed by passive torque cancellation lookup table 68.

Control loop 50 within controller 38 may be embodied in an electronics box or an integrated circuit, using any of a variety of well-known structures. A microprocessor may be used to execute commands that are embodied in any of a wide variety of well known devices. For example, torque lookup table 68 may be embodied in any of various memory devices, for example, random access memory (RAM) or read only memory (ROM). A clock may be used as part of control loop 50 within controller 38 to control timing of executing various functions.

Each of rotary switching mechanisms 12, 14 may have its own electronics module, with an integrated circuit or other circuit board device or other electronics located in its own control electronics box 38. Alternatively the electronics for all of rotary switching mechanisms 12 and 14 of switching system 10 (shown in FIG. 1) may be provided as a single module. Switching system 10 may be coupled to suitable power sources in suitable control devices for sending control signals to extend and retract individual paddles 17 (shown in FIGS. 1, 2 and 3).

Precise control of deployment and retraction that can be provided by the present control system 38 can have various benefits including reducing or minimizing disturbances in system 10. As a result, large and abrupt accelerations during the latching process that occur in some prior art systems can be avoided. These large and abrupt accelerations can excite resonances in this type of switching system resulting in large disturbances that can cause poor performance and/or damage to components. By controlling the latching process, disturbances in system 10 (shown in FIG. 1) may be reduced or minimized.

Angle command trajectory 54 may be varied to change the time required for extension or retraction of paddle 17 and thus for the extension and retraction of optical element 16. In one embodiment, angle command trajectory 54 may be set so that the extension or retraction occurs in 20 ms. However, it will be appreciated that there is a large range of variations in operating times for switching mechanisms.

The use of Halbach array 40 allows reduction of the torque that is needed from the motor 30 to rotate paddles 17 carrying optical elements 16. As a result, the power consumption by motor 30 is reduced. A low power consumption both for switching operations or when no switching is occurring may be desirable as this reduces heat dissipation, the reduction of which can be beneficial. For example, reduction of heat can be beneficial in optical systems used in cryogenic environments.

By monitoring angle sensor 36 via Kaman sensor 62 in loop system 50, controller 38 can determine when to activate motor 30 so as to provide the torque pulses required to achieve a desired motion. The result is a rotary actuator that will maintain specific angular positions corresponding to the shallow equilibrium configuration or "operating detents", with substantially no torque required from motor 30, and thus substantially no power consumption while in such shallow equilibrium. When desired, a relatively small excitation torque input from motor 30 will cause rotor 15, due to the use of Halbach array 40, to "snap" or rapidly rotate to the next detent at relatively high speed, where it is followed by another small torque input from the motor, etc. In spite of its high speed, the movement between shallow equilibrium points in FIG. 6 requires essentially no power input other than the small excitation torque pulses necessary to destabilize and subsequently recapture the rotating assembly and to compensate for friction or drag. Hence, typically, a torque generated by Halbach array 40 is greater than a torque generated by motor 30.

Figure 10:
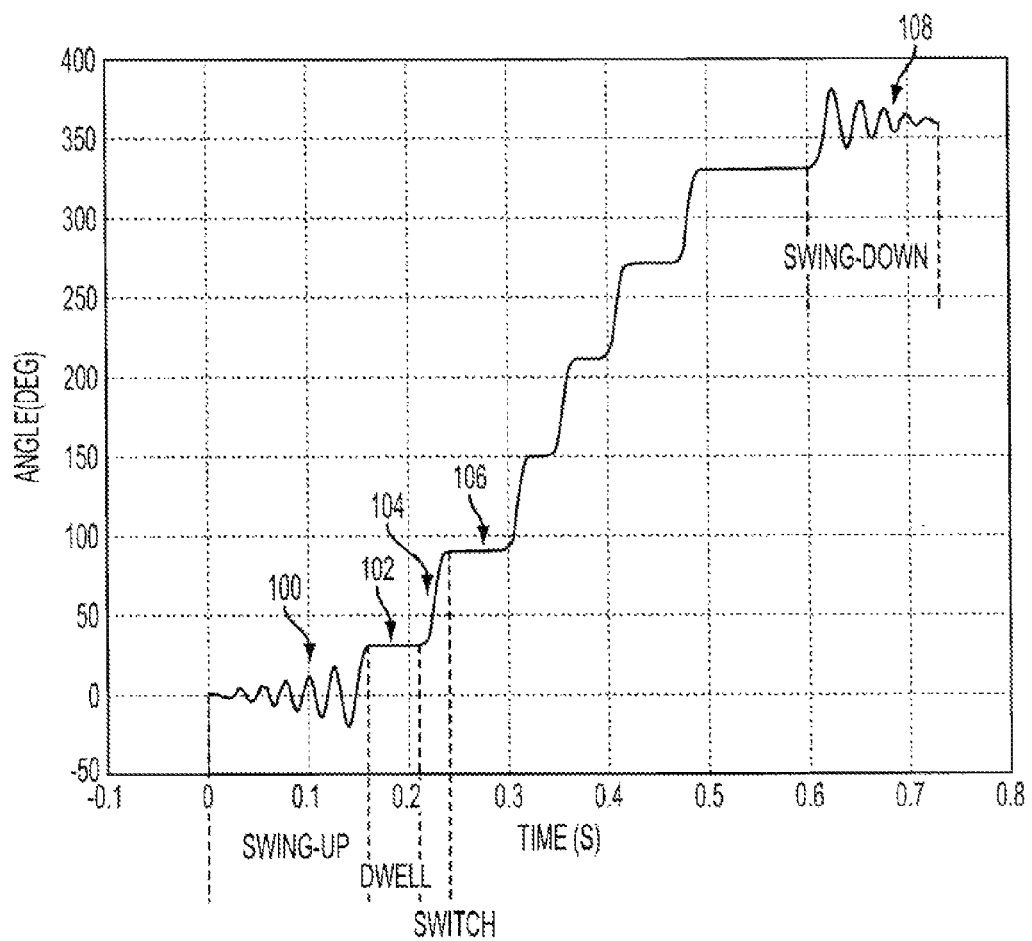
FIG. 10 is plot of an angle of rotation profile of a rotor as a function of time for one revolution, according to one embodiment.

FIG. 10 is plot of the angle of rotation as a function of time for one revolution, i.e., for a rotation of 360 deg., according to one embodiment. In order to minimize the power consumption required, a relatively large Halbach torque amplitude produced by Halbach array 40 is desired. In most designs, the maximum Halbach torque will be larger than the maximum torque that motor 30 is capable of exerting on rotor 15. In operation, when power is turned off, controller 38 will no longer hold the Halbach array in one of the unstable configuration and thus it will naturally fall into one of the stable configurations. In order to move rotor 15 from a stable position to an unstable position, an oscillation of rotor 15 is induced using motor 30. In each oscillation, motor 30 is able to apply torque to rotor 15 in such a way that the amplitude of the oscillation increases. Once rotor 15 reaches an unstable position, the oscillation is stopped and the servo holds rotor 15 until a switch command is received. This behavior is shown in FIG. 10. A similar method is used in reverse during power-down so that the rotor is moved from an unstable null to a stable null in a controlled manner.

FIG. 10 is a plot of the angle of rotation of rotor 15 as a function of time elapsed (in seconds). As shown in this plot, motor 30 induces oscillations 100 with increasing amplitude to bring rotor 15 to unstable position 102. The oscillation 100 is stopped and the servo controller 38 holds rotor 15 at the unstable angular position 102 until a switch command from the controller 38 is sent to motor 30. Once a switch command sent by controller 38 is received by motor 30, motor 30 excites Halbach array 40 and the angular position of rotor 15 is switched at 104 from unstable position 102 to another unstable position 106. This process can be repeated until making a full 360 deg. rotation, at which point motor 30 may be powered down by decreasing amplitudes 108 to a stable null position.

In the above paragraphs, embodiments are described where each of the two mechanisms 12 and 14 for rotating paddles 17A and 17B is provided with rotor 15 for rotating its associated series of paddles 17A and 17B. However, in another embodiment, one rotor can be used to rotate both series of paddles 17A and 17B. One rotor 15 can be used, for example, to rotate paddles 17B and the rotation of rotor 15 can be transferred to paddles 17A by using a transmission belt including, for example, a pair of belts or bands, as will be described further in detail in the following paragraphs.

Figure 11A:
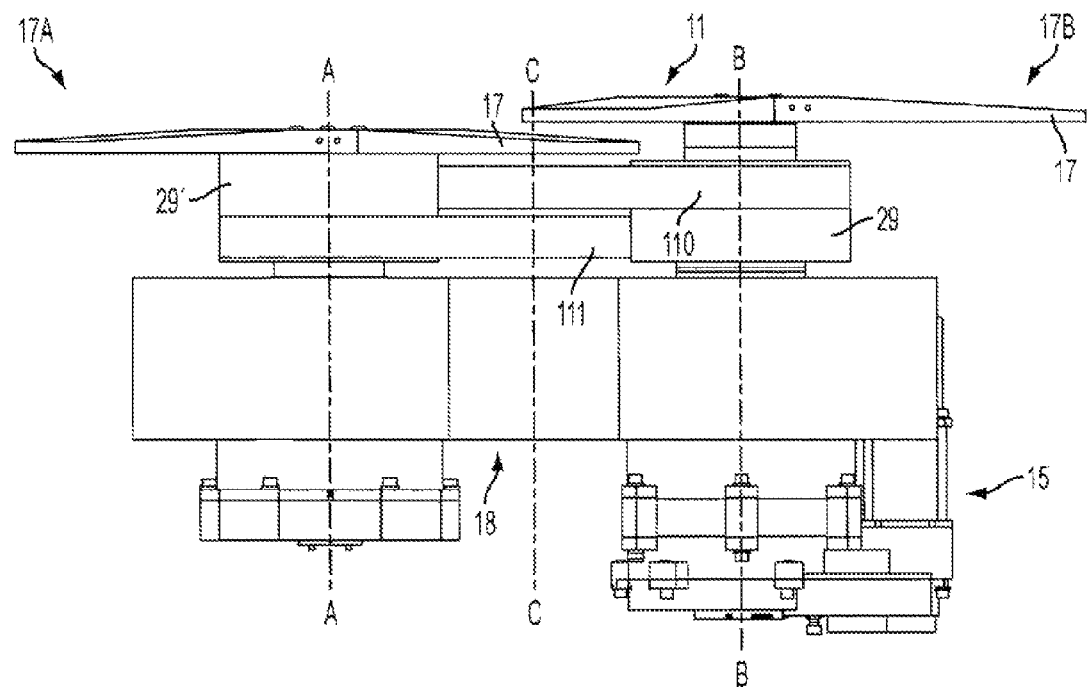
FIG. 11A is an elevation view of a system for moving optical elements, according to another embodiment.
Figure 11B:
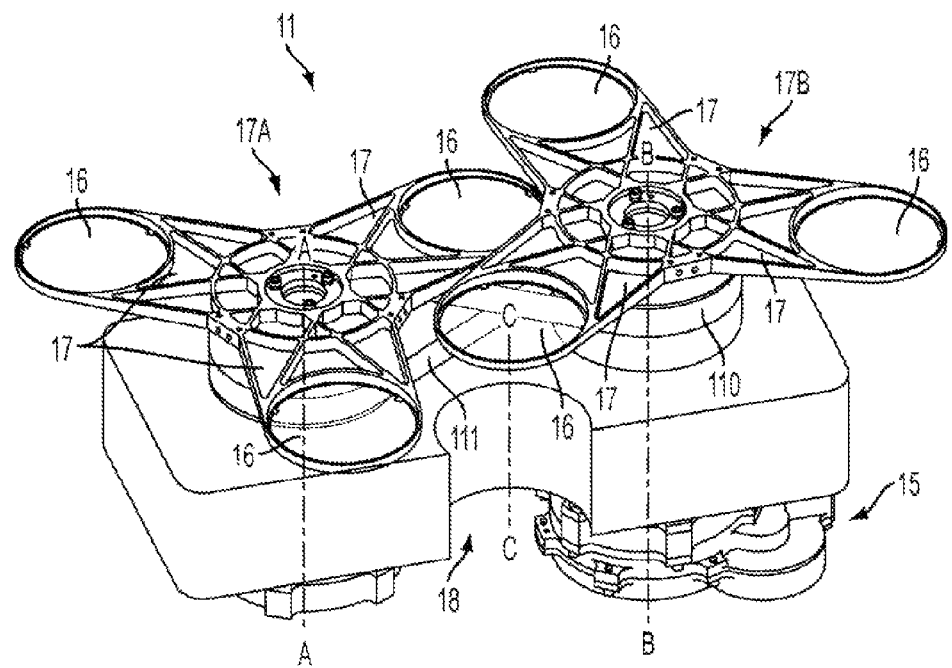
FIG. 11B is a three-dimensional perspective view of system shown in FIG. 11A.

FIG. 11A is an elevation view of a system 11 for moving optical elements 16, according to another embodiment. FIG. 11B is a three-dimensional perspective view of system 11. System 11 is similar in many aspects to system 10 described above. Therefore, the above description with respect to common features will not be repeated in the following paragraphs. However, as shown in FIGS. 11A and 11B, in system 11, only one rotor 15 is used to rotate both series of paddles 17A and 17B. Rotor 15 is configured to rotate paddles 17B through cylinder extension or pulley 29 (shown in FIG. 3). The rotation of cylinder extension 29 is transmitted via transmission belts or transmission bands 110 and 111 to cylinder extension or pulley 29' to which the paddles 17A are coupled. Hence, in this embodiment, cylinder extension 29' is not rotated by a second rotor 15 but simply rotated by the same rotor 15 that rotates cylinder extension or pulley 29.

Figure 12:
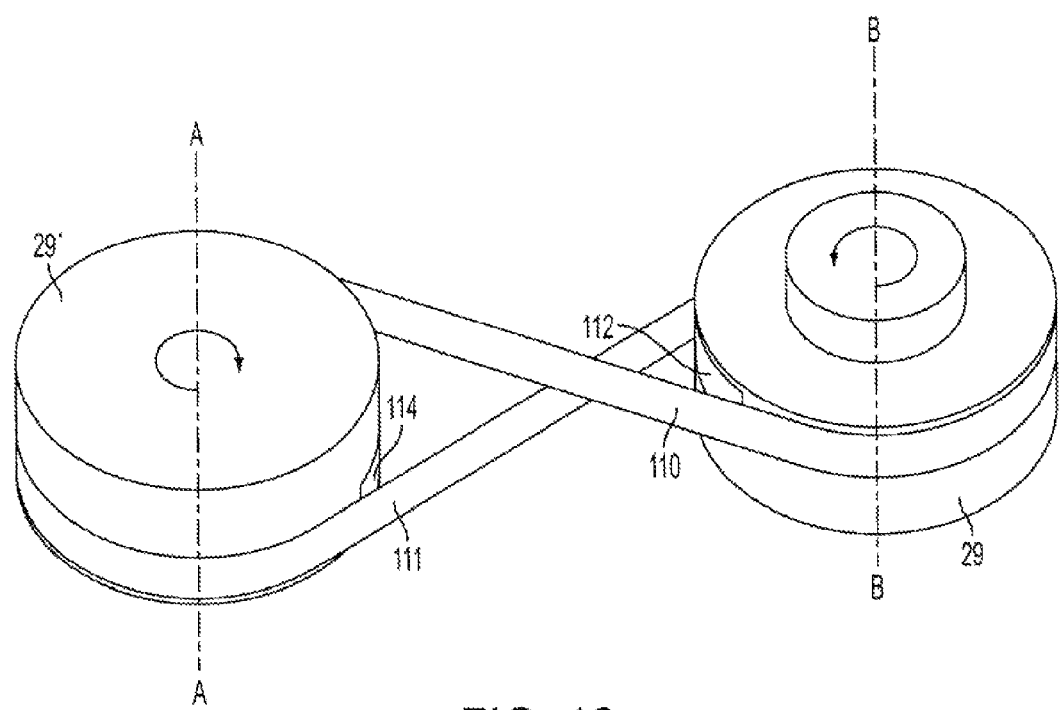
FIG. 12 shows a three-dimensional perspective of belts in an "8" configuration around pulleys used for rotating the optical elements, according to one embodiment.

In one embodiment, transmission belt which includes bands or belts 110 and 111 are arranged in an "8" configuration around cylinder extensions or pulleys 29 and 29'. FIG. 12 shows a three-dimensional perspective of belts 110 and 111 in a "figure 8" configuration around pulleys 29 and 29', according to one embodiment. One end 112 of belt 110 is attached to pulley 29. Belt 110 is looped around pulley 29 and is extended to pulley 29'. An end opposite to end 112 of belt 110 (not shown) is attached to pulley 29'. Similarly, one end 114 of belt 111 is attached to pulley 29'. Belt 111 is looped around pulley 29' and is extended to pulley 29. An end opposite to end 114 of belt 111 (not shown) is attached to pulley 29. In one embodiment, belts 110 and 11 are made of metal (e.g., steel). However, other types of materials can be used. In this embodiment, belts 110 and 111 are shown having smooth surfaces. However, in other embodiments, it is contemplated that belts 110 and 111 be provided with rugged surfaces (e.g., surfaces having teeth or the like). In one embodiment, the transmission belt which include belts 110 and 111 further includes a belt tensioning device that allow for adjusting belt tension, for example, such that a first band mode is above 1000 Hz (or 10 times the servo bandwidth). In one embodiment, pulleys 29 and 29' are provided with a relatively large diameter so as to keep a length of belts 110 and 111 short. By using relatively short belts 110 and 111, belts 110 and 111 can be used at higher frequency (e.g. around 1000 Hz) regimes. In addition, by using relatively short belts 110 and 111, bending stresses on belts 110 and 111 can be reduced and minimized which provides higher reliability for the belts.

As shown in FIGS. 11A and 11B, a line of sight or line of beam path CC is not coplanar with the two rotation axes AA and BB of respectively paddles 17A and 17B. By positioning the line of sight or line of beam path CC away from the plane containing the axes AA and BB, the bands are prevented from being located within the aperture 18.

As shown in FIG. 12, for example, when rotor 15 rotates pulley 29 counter-clockwise, the rotation is transmitted through belts 110 and 11 to pulley 29' which rotates clockwise due to the "8" configuration of belts 110 and 111. By rotating the pulleys 29 and 29' in opposite direction, a net angular momentum is maintained to substantially zero as the angular momentum generated by the rotation of pulley 29 is cancelled by the opposite angular momentum generated by pulley 29'.

Figure 13:
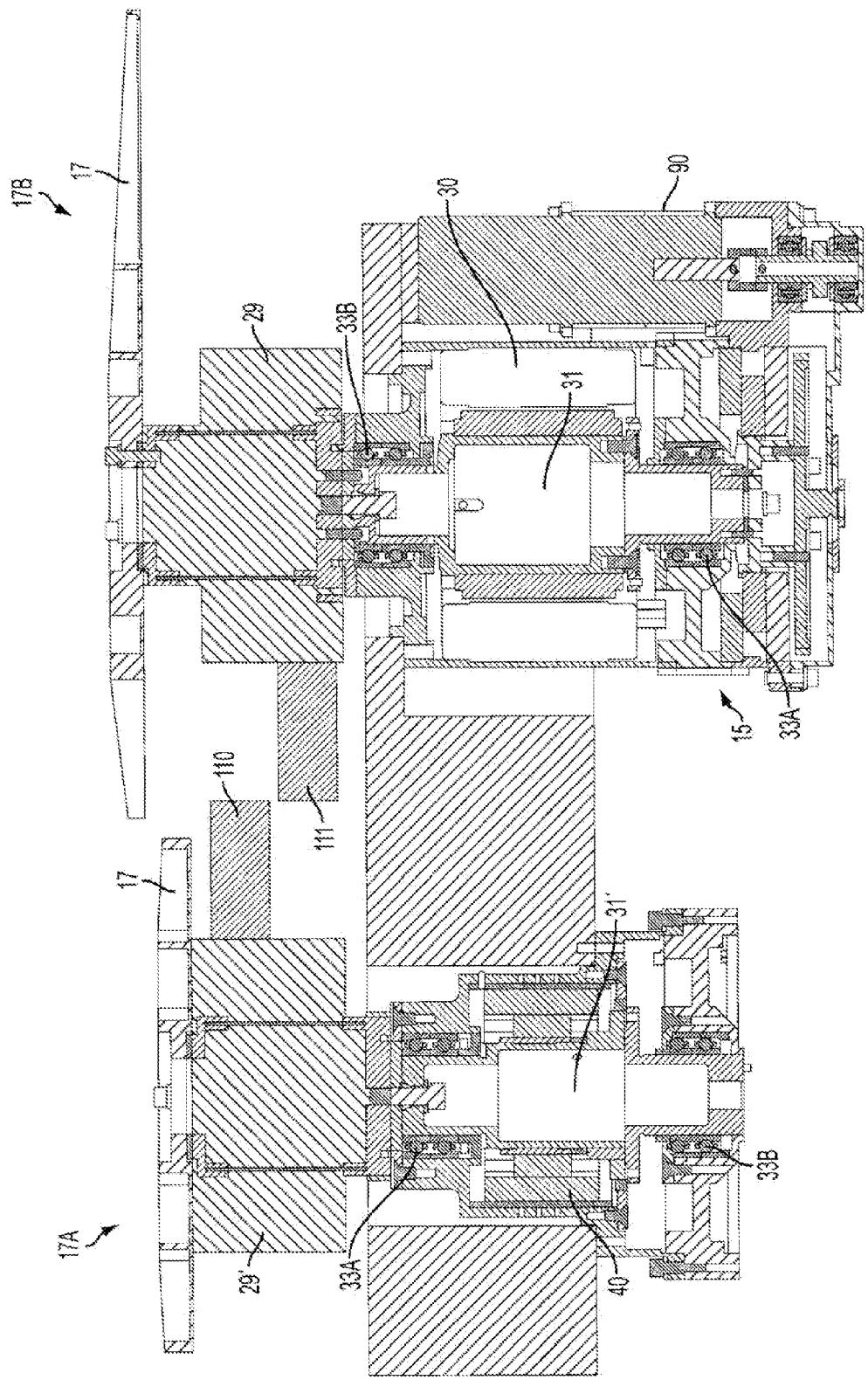
FIG. 13 is a cross-sectional view of system shown in FIG. 12 showing a Halbach array located outside of a rotor; according to one embodiment.

In system 11, one rotor 15 is used to rotate both pulleys 29 and 29'. As described in the above paragraphs, in one embodiment, rotor 15 includes Halbach array 40 to reduce the amount of torque that is needed to be generated by motor 30 to rotate paddles 17. In another embodiment, Halbach array 40 is not provided within rotor 15. Halbach array 40 is located outside of rotor 15. FIG. 13 is a cross-sectional view of system 11 showing the Halbach array 40 located outside of rotor 15. In this embodiment, Halbach array 40 is located near pulley 29' provided for rotating paddles 17A. In the embodiment depicted in FIG. 13, a rotation impulsion is provided to Halbach array 40 by motor 30 in rotor 15. A rotation of motor 30 is transmitted via axle 31 to pulley 29 which rotate belts 110 and 111. A rotation of belts 110 and 111 causes pulley 29' to rotate which in turn causes axle 31' to rotate and transmit the rotation impulsion to Halbach array 40. Similarly, a torque generated by Halbach array 40 is transmitted to both pulleys 29 and 29' to rotate associated paddles 17A and 17B. A rotation of Halbach array 40 causes a rotation of axle 31' which causes pulley 29' to rotate. A rotation of pulley 29' is transmitted to pulley 29 via belts 110 and 111. Although, Halbach array is described being used in system 11. In another embodiment, Halbach array 40 can be omitted. In which case, motor 30 within rotor 15 can act as a sole actuator for rotating pulleys 29 and 29' and thus paddles 17A and 17B. In fact, the use of Halbach array 40 inside or outside rotor 15 can be optional.

One difference between system 11 and system 10 is that rotor 15 in system 11 can not be spun around for multiple rotations when single looped belts are used. More than one revolution can be accomplished in system 11 if belts 110 and 111 are spiraled around pulleys 29 and 29'. However, using spiraled belts may increase a size of system 11.

Since one revolution of pulleys 29 and 29' allows to rotate paddles 17A and 17B a full 360 deg., each of the filters 16 can be positioned along the line of sight CC facing the aperture 18 in a fixed sequence. This can be implemented in forward order and then in reverse order, if desired. As a result, limiting the rotation of pulleys 29 and 29' to one revolution is not constraining.

By using the "figure 8" configuration in system 11 the number of rotors 15 (including motors 30) is reduced from two to one. In addition, by using the "figure 8" configuration, a rotation of rotor 15 is transferred to pulleys 29 and 29' at the same time and with substantially the same torque, but with opposite motions of pulleys 29 and 29'. This allows reaction torques cancellation, thus keeping reaction disturbances within a specified value. Furthermore, this ensures that pulleys 29 and 29' rotate with exactly opposite motion profiles even when using an open loop controller 38.

Furthermore, in system 11 the number of components that may fails is reduced due to the use of one rotor 15 and one controller 38 instead of using two rotors 15 and two controllers 38. In addition, by using one controller 38 for rotor 15 in system 11 instead of two controllers 38 for rotors 15 in system 10, the complexity of associated electronics is also reduced which reduces the likelihood of electronic failure. Moreover, the use of single controller 38 in system 11 instead of two controllers 38 allows, inter alia, to reduce the weight as well as the volume that the system occupies. In system 10 that uses two rotors 15, if a failure occurs with one of the rotors 15, each rotor 15 is provided with a retraction mechanism to move the associated paddles 17 into a desired position. On the other hand, in system 11, because only one rotor 15 is used, a single retraction mechanism 90 (shown in FIG. 13) can enable moving the paddles 17A and 17B into desired position. Therefore, in system 11, not only the number of rotors 15 is reduced from two to one but also the number of retraction mechanisms that are provided in case of failure is also reduced from two to one.

It should be appreciated that in one embodiment, the drawings herein are drawn to scale (e.g., in correct proportion). However, it should also be appreciated that other proportions of parts may be employed in other embodiments.

Although the inventive concept has been described in detail for the purpose of illustration based on various embodiments, it is to be understood that such detail is solely for that purpose and that the inventive concept is not limited to the disclosed embodiments, but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment.

Furthermore, since numerous modifications and changes will readily occur to those with skill in the art, it is not desired to limit the inventive concept to the exact construction and operation described herein. Accordingly, all suitable modifications and equivalents should be considered as falling within the spirit and scope of the present disclosure.

What is claimed:

1. A system for moving optical elements, comprising:
a first rotor and a second rotor configured to rotate in opposite directions, the first rotor comprising a first motor and a first Halbach array, the second rotor comprising a second motor and a second Halbach array;
a first plurality of paddles coupled to the first rotor, each of the plurality of paddles comprising an aperture configured to receive a first optical element; and
a second plurality of paddles coupled to the second rotor, each of the plurality of paddles comprising an aperture configured to receive a second optical element,
wherein the first Halbach array activates to change an angular position of the first rotor from a first desired unstable position to a second desired unstable position, and
wherein the second Halbach array activates to change an angular position of the second rotor from a first desired unstable position to a second desired unstable position.

2. The system of claim 1, wherein the first optical element, the second optical element, or both, comprise an optical lens, a prism, a grating, a polarization filter, a spectral filter, a ray-blocking element, a uniform temperature black surface, or a mirror.

3. The system of claim 1, wherein the first rotor and the second rotor are mounted to a mounting structure for mounting onto a base structure via vibration isolators for isolating the base structure from vibrations originating from the first rotor or the second rotor.

4. The system of claim 1, wherein the first motor, the second motor, or both, are DC motors.

5. The system of claim 1, further comprising a first cylindrical extension coupled to the first rotor and a second cylindrical extension coupled to the second rotor, wherein the first cylindrical extension and the second cylindrical extension are configured as spacers so as to position the first paddles and the second paddles at different heights.

6. The system of claim 1, wherein a torque generated by the first Halbach array is greater than a torque generated by the first motor and a torque generated by the second Halbach array is greater than a torque generated by the second motor.

7. The system of claim 1, wherein the first rotor further comprises a first axle coupled to the first motor and the second rotor further comprises a second axle coupled to the second motor.

8. The system of claim 1, wherein the first Halbach array and the second Halbach array comprise a rotatable cylindrical portion substantially concentrically disposed within a static cylindrical portion, the rotatable cylindrical portion and the static cylindrical portion comprising a plurality of magnets.

9. The system of claim 8, wherein in the static cylindrical portion a direction of magnetization of each successive magnet in the plurality of magnets is rotated clockwise as the plurality of magnets in the static cylindrical portion is traversed in clockwise direction, and wherein in the rotatable cylindrical portion a direction of magnetization of each successive magnet in the plurality of magnets is rotated counterclockwise as the plurality of magnets in the static cylindrical portion is traversed in a clockwise direction.

10. The system of claim 9, wherein, in an unstable configuration, magnetic fields of the plurality of magnets in the rotatable cylindrical portion and magnetic fields in the plurality of magnets in the static cylindrical portion are oriented so that there is a repulsion between the plurality of magnets of the rotatable cylindrical portion and the plurality of magnets of the static cylindrical portion.

11. The system of claim 8, wherein, in a stable configuration, magnetic fields of the plurality of magnets in the rotatable cylindrical portion and magnetic fields in the plurality of magnets in the static cylindrical portion are oriented so that there is attraction between the plurality of magnets of the rotatable cylindrical portion and the plurality of magnets of the static cylindrical portion.

12. The system of claim 1, further comprising a first controller in communication with the first rotor and a second controller in communication with the second rotor, wherein the first controller and the second controller use a feedforward command and feedback signal to command the first rotor and the second rotor to rotate in opposite direction with substantially a same motion profile.

13. The system of claim 12, wherein the first controller is connected to a first angle sensor for detecting an angular position of the first rotor and the second controller is connected to a second angle sensor for detecting an angular position of the second rotor.

14. The system of claim 12, wherein each of the first and second controllers includes a control loop for controlling the first rotor and the second rotor.

15. The system of claim 14, wherein the control loop comprises a passive torque cancellation lookup table for providing a desired motor torque as a function of angle for the first rotor and the second rotor.

16. The system of claim 15, wherein the torque cancellation table is populated based on measured passive torque profile generated by each of the first rotor and the second rotor.

17. The system of claim 15, wherein the cancellation torque table is used to equalize a torque generated by the first rotor and a torque generated by the second rotor.

18. The system of claim 1, wherein the first motor is configured to maintain the first rotor in the first and second desired unstable positions of the first rotor, and wherein the second motor is configured to maintain the second rotor in the first and second desired unstable positions of the second rotor.

19. The system of claim 1, wherein the first rotor and the second rotor are configured to move the first optical element between a retracted position and a desired position and to move the second optical element between the desired position and a retracted position substantially simultaneously, such that a reaction torque of the first rotor cancels a reaction torque of the second rotor.

20. The system of claim 1, wherein both the first and second rotors are configured to rotate continuously in complete revolutions.

\* \* \* \* \*